US011269770B2

(12) United States Patent
Xu et al.

(10) Patent No.: US 11,269,770 B2
(45) Date of Patent: Mar. 8, 2022

(54) METHOD, APPARATUS, AND COMPUTER PROGRAM PRODUCT FOR MANAGING STORAGE SPACE PROVIDED ACROSS MULTIPLE STORAGE SYSTEMS

(71) Applicant: EMC IP Holding Company LLC, Hopkinton, MA (US)

(72) Inventors: Xinlei Xu, Beijing (CN); Xiongcheng Li, Beijing (CN); Lifeng Yang, Beijing (CN); Geng Han, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 16/579,981

(22) Filed: Sep. 24, 2019

(65) Prior Publication Data

US 2020/0133848 A1    Apr. 30, 2020

(30) Foreign Application Priority Data

Oct. 30, 2018    (CN) .......................... 201811279970.4

(51) Int. Cl.
*G06F 12/02*    (2006.01)
*G06F 12/06*    (2006.01)

(52) U.S. Cl.
CPC ...... *G06F 12/0284* (2013.01); *G06F 12/0615* (2013.01); *G06F 2212/1044* (2013.01)

(58) Field of Classification Search
CPC ......... G06F 12/0284; G06F 2212/1044; G06F 12/0615
See application file for complete search history.

(56) References Cited

U.S. PATENT DOCUMENTS

| 8,443,163 | B1 * | 5/2013 | Bailey ..................... G06F 3/064 711/170 |
| 9,448,886 | B2 | 9/2016 | Shuster |
| 9,946,460 | B2 | 4/2018 | Schnapp et al. |
| 2016/0062856 | A1 * | 3/2016 | Mu ..................... G06F 11/2071 714/4.12 |
| 2019/0310925 | A1 * | 10/2019 | Yoshida ................ G06F 3/0614 |

* cited by examiner

*Primary Examiner* — Eric Cardwell
(74) *Attorney, Agent, or Firm* — BainwoodHuang

(57) ABSTRACT

Techniques involve managing a storage space. In response to receiving an allocation request for allocating a storage space, a storage space size and a slice size are obtained. A first storage system and a second storage system are selected from multiple storage systems, the first storage system and the second storage system includes a first storage device group and a second storage device group respectively, and the first storage device group does not overlap the second storage device group. A first slice group and a second slice group is obtained from the first storage system and the second storage system respectively, on the basis of the size of the storage space and the size of the slice. A user storage system is built at least on the basis of the first slice group and the second slice group, so as to respond to the allocation request.

21 Claims, 11 Drawing Sheets

METHOD, APPARATUS, AND COMPUTER PROGRAM PRODUCT FOR MANAGING STORAGE SPACE PROVIDED ACROSS MULTIPLE STORAGE SYSTEMS

CROSS-REFERENCE TO RELATED APPLICATION

This application claims priority to Chinese Patent Application No. CN201811279970.4, on file at the China National Intellectual Property Administration (CNIPA), having a filing date of Oct. 30, 2018, and having "METHOD, APPARATUS, AND COMPUTER PROGRAM PRODUCT FOR MANAGING STORAGE SPACE" as a title, the contents and teachings of which are herein incorporated by reference in their entirety.

FIELD

Various implementations of the present disclosure generally relate to storage management, and more specifically, to a method, apparatus and computer program product for providing data storage.

BACKGROUND

With the development of data storage techniques, various data storage devices now provide users with increasingly large data storage capacity, and their data access speed has been improved greatly. In storage systems, there has been proposed the concept of storage resource pool. A storage resource pool in a storage system may include a plurality of storage devices, and each among the plurality of storage devices may include a plurality of extents. At this point, a corresponding storage space may be allocated to a user according to the size requested by the user.

Storage spaces in the storage system may be allocated to a plurality of users. However, due to limits of the capacity of storage spaces in the storage system and the response speed of the storage system for user requests, when a workload of the storage system reaches a high level, the response speed for users will slow down. At this point, how to manage storage spaces more effectively becomes a focus of research.

SUMMARY

Therefore, it is desirable to develop and implement a technical solution for managing storage spaces more effectively. It is desired that the technical solution can be compatible with existing storage systems and manage storage spaces more effectively by reconstructing various configurations of these storage systems.

According to a first aspect of the present disclosure, there is provided a method for managing a storage space. In the method, in response to receiving an allocation request for allocating a storage space, the size of a storage space and the size of a slice in the storage space which are specified by the allocation request are obtained. A first storage system and a second storage system are selected from multiple storage systems, here the first storage system and the second storage system includes a first group of storage devices and a second group of storage devices respectively, and the first group of storage devices do not overlap the second group of storage devices. A first group of slices and a second group of slices are obtained from the first storage system and the second storage system respectively, on the basis of the size of the storage space and the size of the slice. A user storage system is built at least on the basis of the first group of slices and the second group of slices, so as to respond to the allocation request.

According to a second aspect of the present disclosure, there is provided an apparatus for managing a storage space, the apparatus including: at least one processor; a volatile memory; and a memory coupled to the at least one processor, the memory having instructions stored thereon, the instructions, when executed by the at least one processor, causing the apparatus to perform acts. The acts include: in response to receiving an allocation request for allocating a storage space, obtaining the size of a storage space and the size of a slice in the storage space which are specified by the allocation request; selecting a first storage system and a second storage system from multiple storage systems, the first storage system and the second storage system including a first group of storage devices and a second group of storage devices respectively, and the first group of storage devices not overlapping the second group of storage devices; obtaining a first group of slices and a second group of slices from the first storage system and the second storage system respectively, on the basis of the size of the storage space and the size of the slice; and building a user storage system at least on the basis of the first group of slices and the second group of slices, so as to respond to the allocation request.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
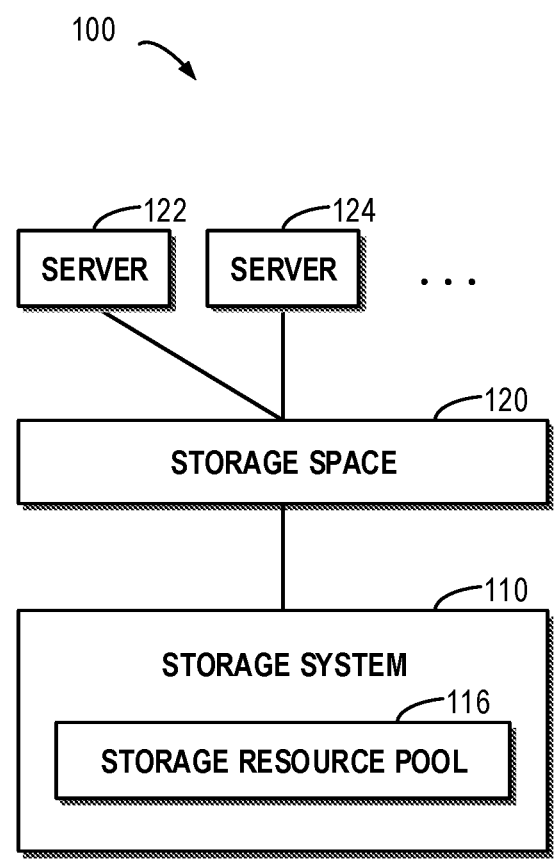
FIG. 1 schematically shows a block diagram of a technical solution for managing a storage space.

FIG. 1 schematically shows a block diagram 100 of a technical solution for managing a storage space. As depicted, there is a storage resource pool 116 in a storage system 110. Though not shown in FIG. 1, the storage resource pool 116 may include a plurality of storage devices, and the plurality of storage devices may include a plurality of extents. The plurality of extents in the storage system may provide a storage space 120 to users, so as to be accessed by servers 122, 124 for various users.

It will be understood the servers 122 and 124 here may be servers for accessing different user storage systems. For example, one user storage system A may be used to support online sales service, and the server 122 may be used to access the user storage system A. For another example, another user storage system B may be used to support online music service, and the server 124 may be used to access the user storage system B. Although FIG. 1 depicts only two servers 122 and 124, in other application environment, the storage space 120 may further provide storage spaces to more user storage systems, and there may further exist a larger number of servers.

Figure 2A:
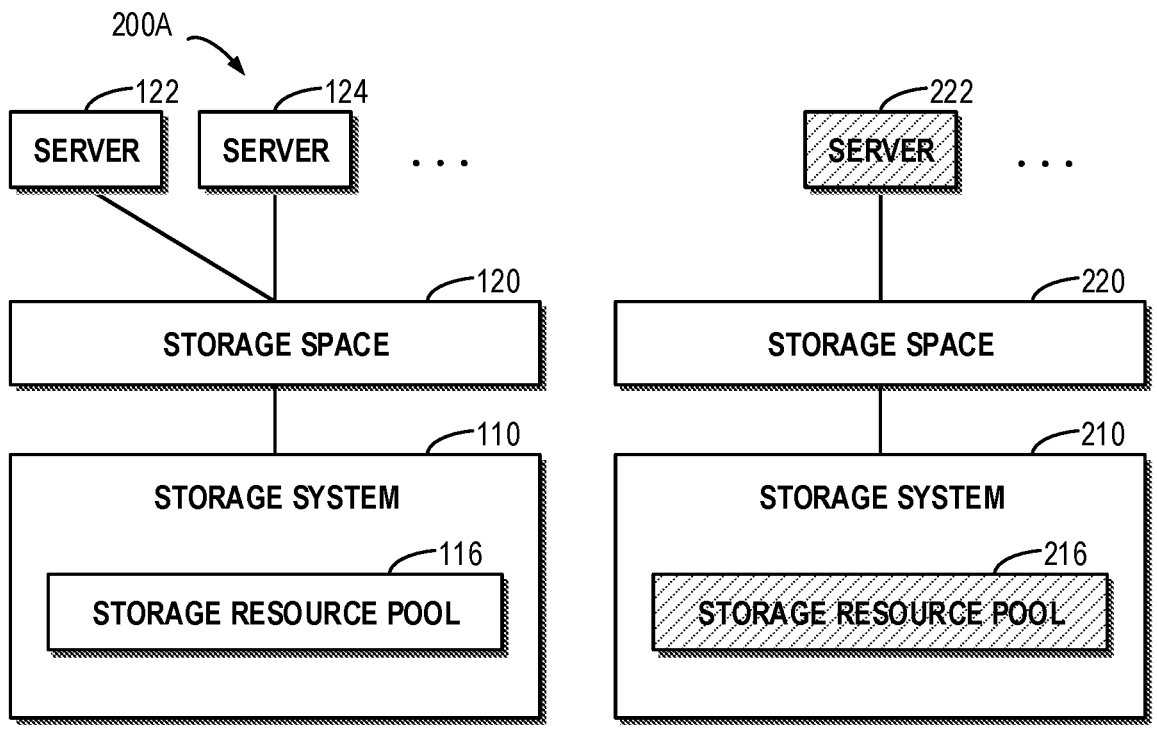
FIG. 2A schematically shows a block diagram of a storage environment before data migration.
Figure 2B:
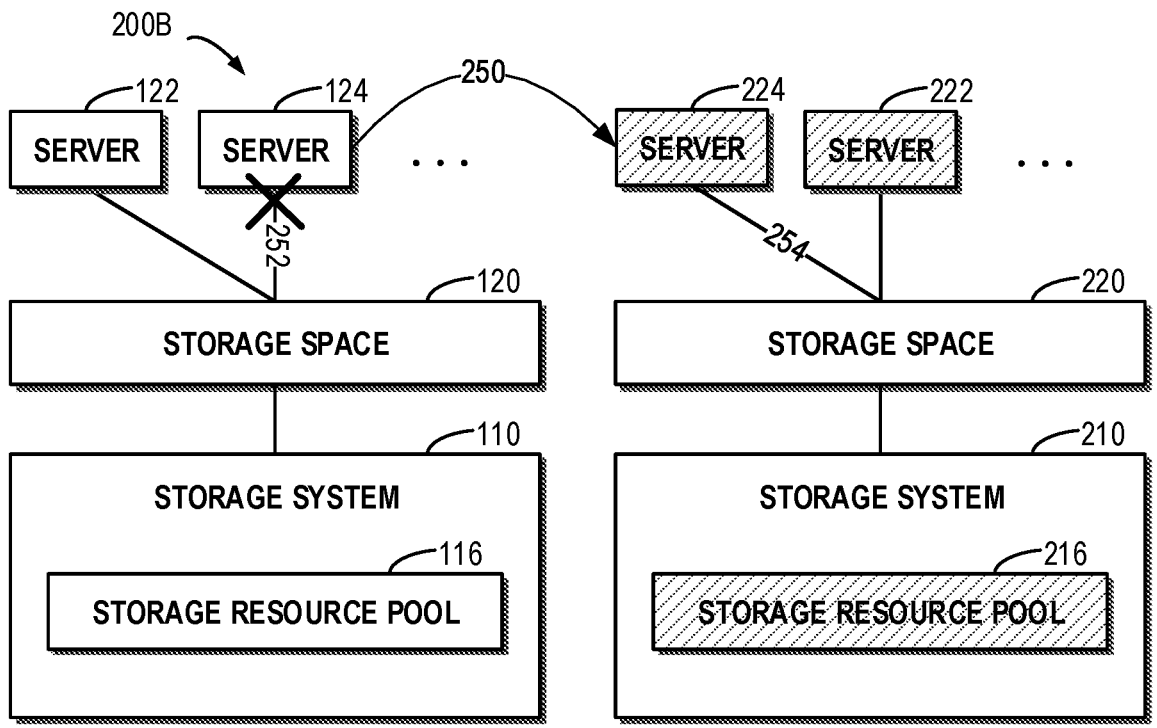
FIG. 2B schematically shows a block diagram of a storage environment after data migration.

It will be understood in the technical solution as shown in FIG. 1, with the increase of servers, the workload of the storage system 110 gets increasingly heavy. At this point, the storage system 110 might be overloaded and thus fail to respond to access requests from various servers within an acceptable time, and then data migration is a must. With reference to FIGS. 2A and 2B, description is presented below to the process of data migration.

FIG. 2A schematically shows a block diagram of a storage environment 200A before data migration. As shown in the right of FIG. 2A, there is schematically shown another storage system 210, which may include a storage resource pool 216. Like the storage system 110, each extent in the storage system 210 may provide a storage space 220 to the outside so as to be accessed by various servers. At this point, a server 222 may access space in the storage space 220. As the workload of the storage system 110 increases, the storage system 110 might be unable to provide services to many servers 122, 124, etc. Therefore, one part of services provided by the storage system 110 have to be migrated to the storage system 210 with a lighter workload.

FIG. 2B schematically shows a block diagram of a storage environment 200B after data migration. In the figure, as shown by an arrow 250, first the server 124 may be migrated to the position where a server 224 resides. In this process, many data copy operations are involved, which is time-consuming and strenuous. Further, a connection 252 between the server 124 and the storage space 120 may be broken, and a connection 254 may be established between the server 224 and the storage space 220. In this way, all services related to the server 224 will be migrated to the storage space 220 provided by the storage system 210. Thereby, the heavy workload at the storage system 110 may be eased. In this data migration process, complex operations will be involved, and moreover a large number of data copy operations are required in order to achieve a load balance between the storage systems 110 and 210.

Although the technical solution of data migration can alleviate the workload imbalance between multiple storage systems, the server 124 has to shut down during the data migration, which will seriously impact the user experience.

To solve the foregoing drawbacks, implementations of the present disclosure provide a method, apparatus and computer program product for managing a storage space. With implementations of the present disclosure, the storage space may be provided to a user more effectively. Detailed description is presented below to specific implementations of the present disclosure. According to implementations of the present disclosure, provided is a method for managing a storage space. In the method, after an allocation request for allocating a storage space is received, the storage space across multiple storage systems may be provided to the user. At this point, since there is no overlap among storage devices in various storage systems, workloads in these storage systems may be balanced in a more effective way. Further, it may be ensured each storage device in these storage systems works below an appropriate workload, so that fast service may be provided to the user.

Figure 3:
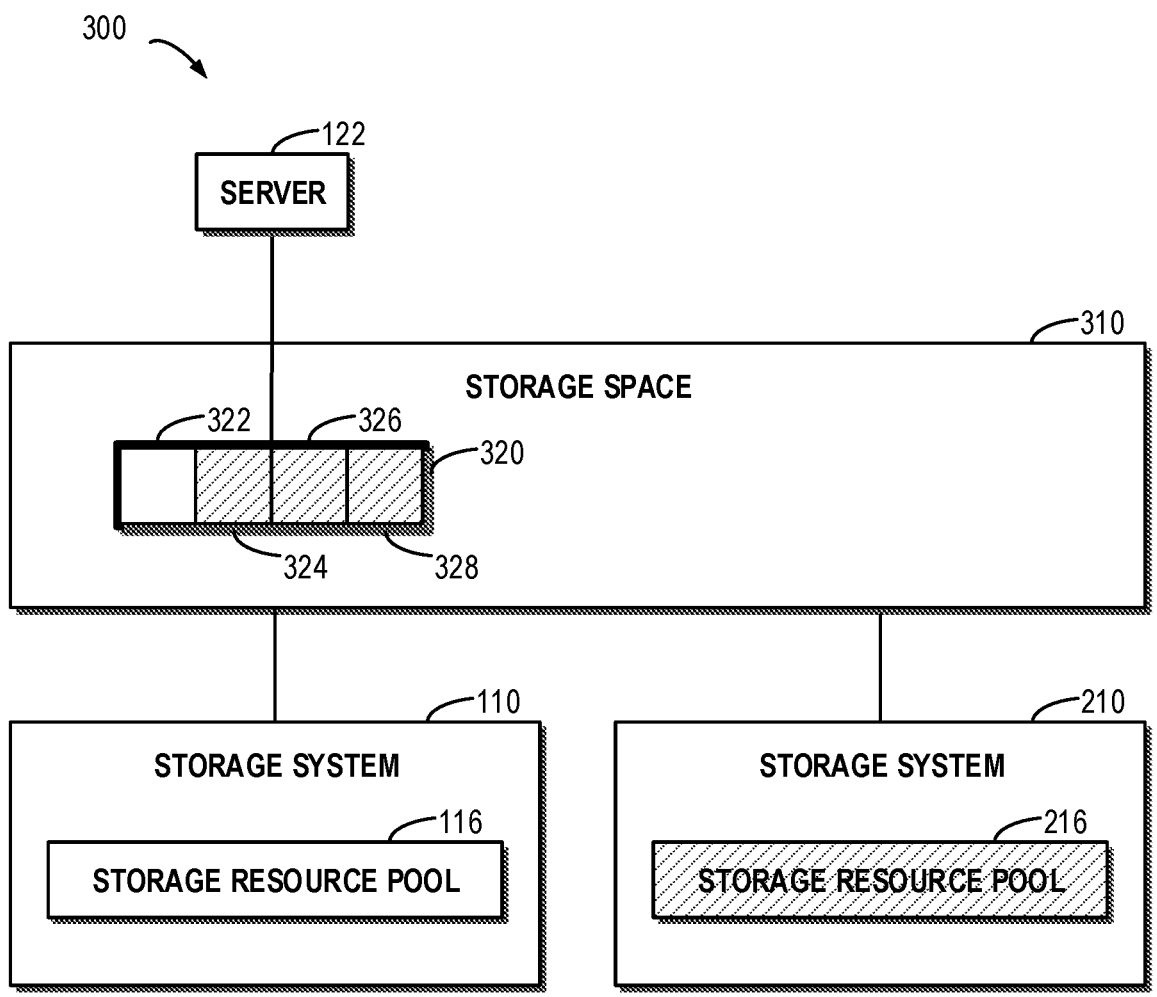
FIG. 3 schematically shows a block diagram for managing a storage space according to implementations of the present disclosure.

With reference to FIG. 3, detailed description is presented below to more details about implementations of the present disclosure. FIG. 3 schematically shows a block diagram 300 for managing a storage space 310 according to implementations of the present disclosure. In the figure, the size of a storage space and the size of a slice in the storage space which are specified by an allocation request may be obtained from the allocation request for allocating the storage space. For example, the allocation request may request the allocation of a 400 M storage space, and it is desired the size of each slice providing a storage space is 100 M. At this point, it may be determined a total of 4 slices need to be allocated from the first storage system 110 and the second storage system 210.

It will be understood although FIG. 3 illustrates only two storage systems 110 and 210, there may exist more storage systems in the whole storage environment. As shown in FIG. 3, the first storage system 110 and the second storage system 210 may be selected from multiple storage systems. Here the first storage system 110 and the second storage system 210 include a storage resource pool 116 and a storage resource pool 216 respectively, and the storage resource pool 116 and the storage resource pool 216 may include a first group of storage devices and a second group of storage devices respectively. It will be understood according to example implementations of the present disclosure, the number of storage devices in each storage system is not intended to be limited, but the storage resource pools 116 and 216 may include the same or different numbers of storage devices, and the first group of storage devices and the second group of storage devices do not overlap.

It will be understood according to example implementations of the present disclosure, an internal organization mode of the storage systems 110 and 210 is not intended to be limited. The storage systems 110 and 210 may be organized in the same or different mode. For example, the storage system 110 may be an ordinary storage system without redundant data, or may be a high-reliability storage system based on Redundant Array of Independent Disks (RAID). According to example implementations of the present disclosure, the storage systems 110 and 210 may be storage systems based on the same RAID level, or may be storage systems based on different RAID levels.

As shown in FIG. 3, a first group of slices and a second group of slices may be obtained from the first storage system 110 and the second storage system 210 respectively, on the basis of the size of the storage space and the size of the slice. For example, the first group of slices may include 1 slice 322 from the first storage system 110, and the second group of slices may include 3 slices 324, 326 and 328. In this way, a user storage system 320 may be established at least on the basis of the first group of slices and the second group of slices, so as to respond to the allocation request.

It will be understood although FIG. 3 illustrates an example in which a different number of slices are selected from respective storage systems, according to example implementations of the present disclosure, the same number of slices may further be selected from respective storage systems. Further, although FIG. 3 illustrates a circumstance in which slices are selected from two storage systems, according to example implementations of the present disclosure, slices may further be selected from more storage systems.

With the foregoing example implementations, the storage space may be provided to the user across multiple storage systems. At this point, a certain number of slices may be selected from various storage systems in view of workloads of these storage systems. For example, when a storage system has a heavy workload, then less slices (even no slice) may be selected from the storage system; when a storage system has a light workload, then more slices may be selected from the storage system. In this way, workloads at various storage systems may be balanced, and further it may be ensured the user storage system established as such has a higher response speed.

Figure 4:
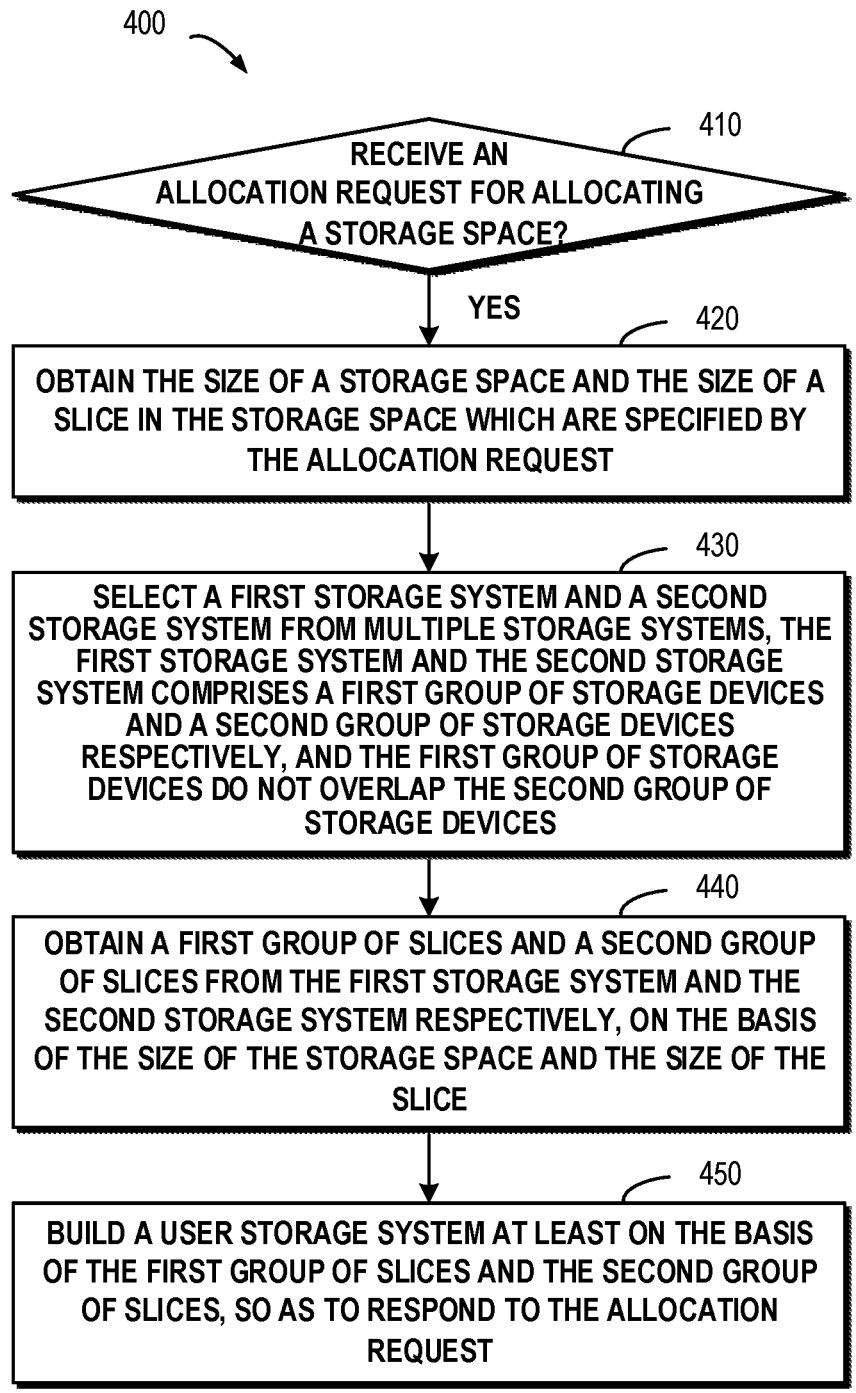
FIG. 4 schematically shows a flowchart of a method for managing a storage space according to implementations of the present disclosure.

General description has been presented to implementations of the present disclosure with reference to FIG. 3. Hereinafter, more details on how to storage a storage space will be described in detail with reference to FIG. 4. This figure schematically shows a flowchart of a method 400 for managing a storage space according to implementations of the present disclosure. At block 410, it is determined whether an allocation request for allocating a storage space is received or not. If it is determined the allocation request is received, then the method 400 proceeds to block 420. At block 420, the size of a storage space specified by the allocation request and the size of a slice in the storage space are obtained. Alternatively and/or in addition to, the allocation request may further specify the number of slices and the size of the slice.

At block 430, a first storage system 110 and a second storage system 210 may be selected from multiple storage systems, the first storage system 110 and the second storage system 210 including a first group of storage devices and a second group of storage devices respectively. It will be understood here the first group of storage devices and the second group of storage devices do not overlap. It will be understood the first storage system 110 and the second storage system 210 may be selected in many ways.

For example, two storage systems having the largest free space may be selected from multiple storage systems. Alternatively and/or in addition to, two storage systems with minimum access pressure may be selected from multiple storage systems. Although as illustrated in FIG. 3 only two storage systems are selected, according to example implementations of the present disclosure, more storage systems may further be selected. For example, regarding the above example, when 4 slices need to be allocated, they may be selected from 3 or 4 storage systems.

At block 440, a first group of slices and a second group of slices are obtained from the first storage system 110 and the second storage system 210 respectively on the basis of the size of the storage space and the size of the slice. According to example implementations of the present disclosure, in view of workloads of the first storage system 110 and the second storage system 210, it may be determined how many slices are selected from each storage system. Specifically, a first workload of the first storage system 110 and a second workload of the second storage system 210 may be obtained, and a first group of slices and a second group of slices may be selected on the basis of the first workload and the second workload respectively.

According to example implementations of the present disclosure, a smaller number of slices may be selected from the first storage system with a heavier workload, and a larger number of slices may be selected from the second storage system with a lighter workload. Returning to FIG. 3, suppose workloads of various storage systems are represented by integers within a range between 0 and 100, and the first workload and the second workload are 75 and 25 respectively. At this point, in view of the ratio between 75 and 25, it may be determined 1 slice is selected from the first storage system 110 and 3 slices are selected from the second storage system 210.

After the first group of slices and the second group of slices are used to create the user storage system, as the user accesses slices in the user storage system, workloads of the first storage system 110 and the second storage system 210 will increase accordingly. At this point, since the first storage system 110 with a heavier workload provides less slices, there is a low probability that these slices will be accessed, which will not seriously degrade the first storage system 110 that is already in heavy workload. In addition, since the second storage system 210 provides more slices, it is highly probable that these slices will be accessed, at which point more access requests will hit the second storage system 210. Since the workload of the second storage system 210 is lighter, even if many access requests hit the second storage system 210, the response speed of the second storage system 210 will not be decreased too much.

With the above example implementations, on the one hand, it is avoided that data need to be migrated from the first storage system 110 to other lightly loaded storage system when the workload of the first storage system 110 continues to rise. On the other hand, a load balance may be stricken among multiple storage systems in a straightforward but effective way.

According to example implementations of the present disclosure, the first workload may include at least one of storage resource service load or access load of the first storage system 110. It will be understood since the capacity of available storage system in the storage system is limited, the service load of storage resources is one of important aspects of the workload. According to example implementations of the present disclosure, the size of a first free space in the first storage system 110 and the size of a second free space in the second storage system 210 may be determined, and according to a proportion between the two sizes, it may be determined how many slices are selected from the first storage system 110 and the second storage system 210 respectively.

It will be understood the capacity of a control node of the storage system for processing access requests from users is also limited. Therefore, the access load will also impact the processing capacity of the storage system. The access load may include many factors. For example, if the control node receives many access requests within a short period of time, at this point some access requests have to be queued. For another example, if an access request received by the control node points to a larger address range, at this point it takes a long time to process such an access request. According to example implementations of the present disclosure, respective access loads of the first storage system 110 and the second storage system 210 may be determined, and further on the basis of a proportion between the two access loads, it may be determined how many slices are selected from the first storage system 110 and the second storage system 210 respectively.

According to example implementations of the present disclosure, in view of both free space and access load, the numbers of slices are selected from the first storage system 110 and the second storage system 210 respectively may be determined. For example, weights may be set to the free space and the access load, and the workload of the storage system may be determined by weighted sum or other means. With the above example implementations, many factors that will impact the storage system may be considered together, so as to select a corresponding number of slices from different storage systems more effectively and further improve the level of load balance among these storage systems.

Returning to FIG. 4, at block 450, a user storage system 320 is established at least on the basis of the first group of slices and the second group of slices, so as to respond to the allocation request. At this point, the user may access various slices in the user storage system 320 via the server 122.

According to example implementations of the present disclosure, an address mapping of the user storage system may be established. Here the address mapping includes a mapping relationship between each slice in the user storage system and a storage system where each slice resides. With the above example implementations, it may be recorded at which address in which storage system a slice allocated to the user is. In this way, when an access request for a target slice in the user storage system is received, a storage system where the target slice resides may be determined conveniently, and further the access request may be guided to the corresponding storage system.

Further, storage spaces in various slices may be addressed in a uniform address format. In this way, when an access request for a target address range in the user storage system is received, a slice corresponding to the target address range may be determined. Further, a physical address range corresponding to the target address range may be found by an address mapping inside the storage system where the slice resides.

According to example implementations of the present disclosure, a unique identifier may be set for the user storage system 320. At this point, each storage system that provides slices for the user storage system 320 may use the same identifier so as to represent various storage systems operate together and jointly provide the user storage system 320.

Figure 5:
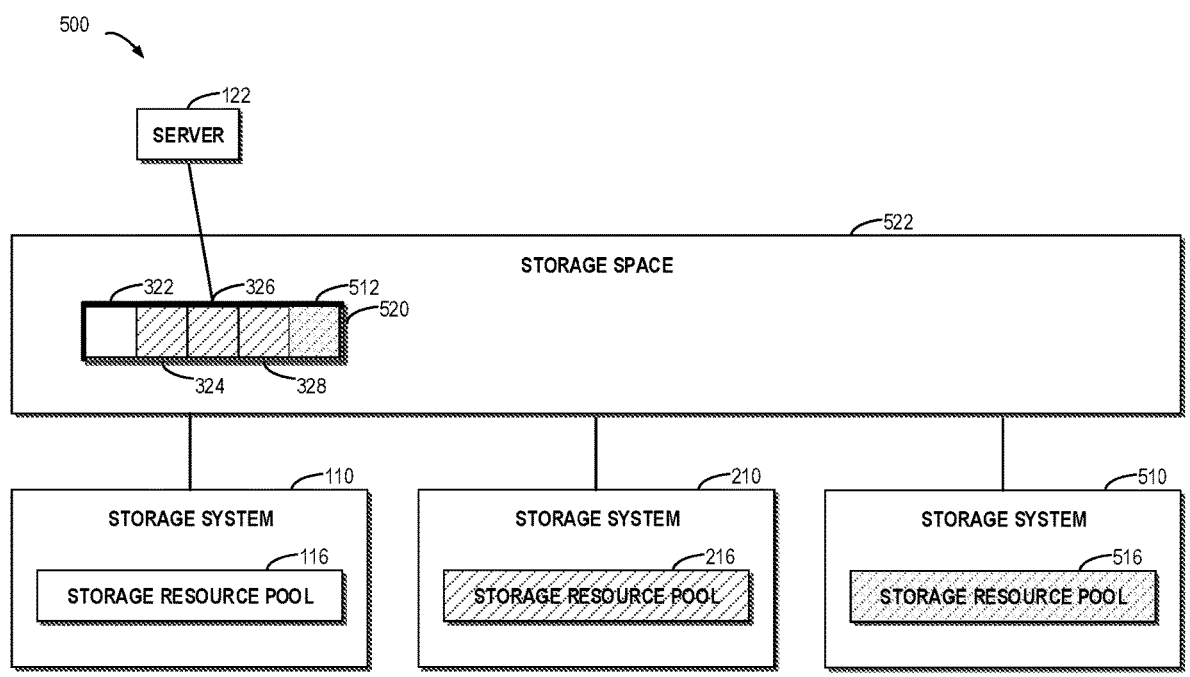
FIG. 5 schematically shows a block diagram for expanding a storage space according to implementations of the present disclosure.

Description has been presented regarding how to select slices from multiple storage systems and create the user storage system 320 on the basis of selected slices. According to example implementations of the present disclosure, after the user storage system 320 is created, the storage space of the user storage system 320 may be expanded according to a user request. If an expansion request for expanding the user storage system 320 is received, the expansion request may be parsed and the size of an expanded space specified by the expansion request may be obtained. With reference to FIG. 5, description is presented below to more details about expansion.

FIG. 5 schematically shows a block diagram 500 for expanding a storage space according to implementations of the present disclosure. Suppose the expansion request specifies a 100 M storage space (i.e., 1 slice) wants to be added to the user storage system 320, at this point a third storage system 510 may be selected from multiple storage systems. It will be understood here the third storage system 510 may be a different storage system from the first storage system 110 and the second storage system 210, and the third storage system 510 may include a third group of storage devices 516. In view of the size (100 M) of the expanded space and the size (100 M) of the slice, a third group of slices may be obtained from the third storage system 510. At this point, the third group of slices will consist of 1 slice, and the user storage system is expanded on the basis of the third group of slices as a response to the expansion request. As shown in FIG. 5, 1 slice may be selected from the storage system 510, and the original user storage system 520 is expanded with a slice 512, so as to form a storage system 520.

It will be understood at this point, the user may access the expanded user storage system 520 in a storage space 522 via the server 122. In this way, with the growth of the user's demands on storage spaces, the size of the user storage system 520 may be continuously expanded by using a new slice. With the above example implementations, by expanding the storage space of the user storage system with a different storage system from those where slices in the user storage system reside, data in the user storage system may be caused to be distributed in more storage systems. In this way, the data migration demand may be avoided when a failure or other situation that will impact the user access speed occurs in a storage system.

It will be understood although the third storage system 510 has been shown as being different from the first storage system 110 and the second storage system 210, according to example implementations of the present disclosure, the third storage system 510 may further be any of the first storage system 110 or the second storage system 210. According to example implementations, when a larger expanded space wants to be added to the original user storage system 320, two or more storage systems may be selected from multiple storage systems, and the user storage system may be expanded on the basis of free spaces in the selected two or three storage systems. According to example implementations of the present disclosure, in view of respective workloads of storage systems, slices may first be selected from a storage system with a lighter workload.

It will be understood perhaps the size of the user storage system 320 needs to be reduced. According to example implementations of the present disclosure, workloads of storage systems where various slices in the user storage system 320 reside may be determined first. Then, slices provided by the storage system with the heaviest workload may be released. According to example implementations of the present disclosure, when selecting to-be-released slices, it should be ensured after the release operation, slices in the user storage system reside in at least two storage systems.

Figure 6:
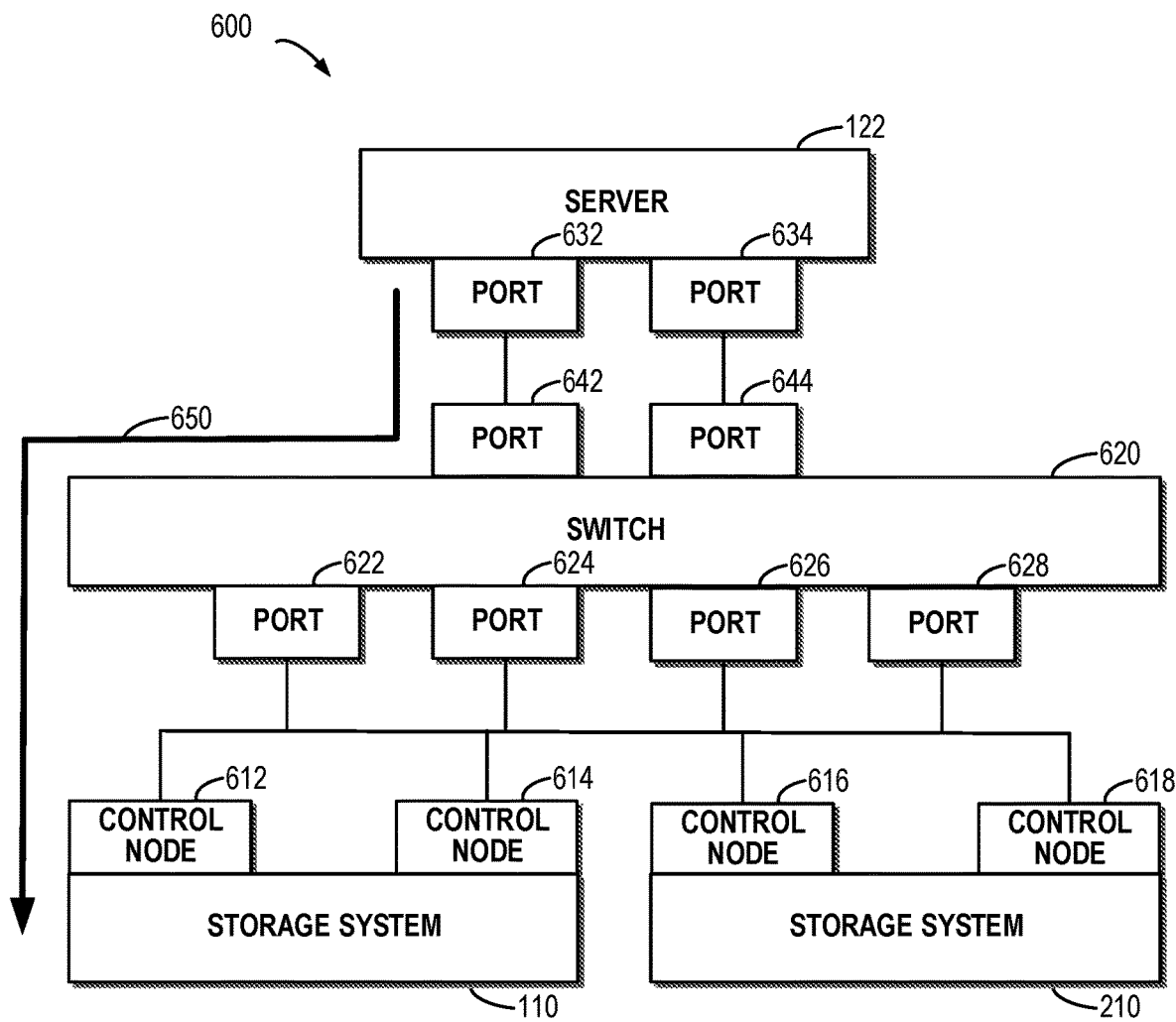
FIG. 6 schematically shows a candidate path for accessing data in a user storage system according to implementations of the present disclosure.

According to example implementations of the present disclosure, the server 122 may be connected via a switch to the first storage system 110 and the second storage system 210. At this point, multiple connection paths may be arranged in order to endure the server 122 can correctly access data in the first storage system 110 and the second storage system 210. With the above example implementations, it may be ensured when a certain connection path or paths fail(s), the server 122 still can use other normal path to access data in the first storage system 110 and the second storage system 210. With reference to FIG. 6, description is presented below to more details about connection paths.

FIG. 6 schematically shows a block diagram 600 of a candidate path for accessing data in the user storage system according to implementations of the present disclosure. It will be understood in order to ensure the reliability of a storage system, the storage system usually provides data access service to the outside through one or more control nodes. In FIG. 2, the storage system 110 may have two control nodes 612 and 614. During the operation of the storage system 110, the two control nodes 612 and 614 may provide service to the outside in parallel. If one node fails, then the other may continue to work. Similarly, the storage system 210 may have two control nodes 616 and 618 so as to provide service to the outside in parallel.

In FIG. 6, the server 122 for accessing the user storage system may be connected to the two storage systems via a switch 620. In order to endure the reliability of data connection, the server 122 may be connected to two ports 642 and 644 of the switch 620 via ports 632 and 634 respectively. In this way, two paths may be provided between the server 122 and the switch 620. Further, the switch 620 may be connected to each of the control nodes 612, 614, 616 and 618 of the first storage system 110 and the second storage system 210. As shown in FIG. 6, ports 622, 624, 626 and 628 of the switch 620 may be connected to the control nodes 612, 614, 616 and 618 respectively.

With the above example implementations, multiple candidate paths may be provided between the switch and the first storage system 110, the second storage system 210. An arrow 650 schematically shows one connection path between the server 122 and the first storage system 110: the server 122—the port 632—the port 642—the switch 620—the port 622—the control node 612—the first storage system 110. It will be understood the arrow 650 merely illustrates one candidate path between the server 122 and the first storage system 110, and the topological structure in FIG. 6 may further include other candidate paths.

For example, as seen from FIG. 6, there may exist 16 candidate paths between the server 122 and various storage systems. For example, another candidate path between the server 122 and the first storage system 110 may be: the server 122—the port 632—the port 642—the switch 620—the port 622—the control node 614—the first storage system 110. For another example, one candidate path between the server 122 and the second storage system 210 may be: the server 122—the port 632—the port 642—the switch 620—the port 622—the control node 616—the second storage system 210. According to example implementations of the present disclosure, candidate paths between the server 122 and various storage systems may be stored using a path table as shown in Table 1 below.

TABLE 1

Candidate Paths

| No. | Identifier | Path |
| --- | --- | --- |
| 1 | Candidate path 1 | Server 122 - port 632 - port 642 - switch 620 - port 622 - control node 612 - first storage system 110 |
| 2 | Candidate path 2 | Server 122 - port 632 - port 642 - switch 620 - port 622 - control node 614 - first storage system 110 |
| 3 | Candidate path 3 | Server 122 - port 632 - port 642 - switch 620 - port 622 - control node 616 - second storage system 210 |
| ... | ... | ... |

According to example implementations of the present disclosure, if an access request for a target slice in the user data storage is received, then first multiple candidate paths between the server 122 and a storage system where the target slice resides may be determined. Regarding the topological structure shown in FIG. 6, the target slice may be accessed via one of multiple candidate paths shown in Table 1.

According to example implementations of the present disclosure, a preferred candidate for each slice in the user storage system 320 may be determined with candidate paths shown in Table 1 above. Description is presented below in the context of accessing a specific target slice. Returning to FIG. 3, suppose an access request for a first slice in the user storage system 320 is received. At this point, first a first candidate path may be selected from multiple candidate paths, and the effort is made to see whether the candidate path can route the access request to the storage system where the first slice resides.

As seen from Table 1 above, the first candidate path is "server 122—port 632—port 642—switch 620—port 622—control node 612—first storage system 110." As seen from FIG. 3, the first slice 322 in the user storage system 320 resides in the first storage system 110. Since the selected candidate path can route the access request to the correct destination, namely the first storage system 110, the selected candidate path may be marked as a recommended path for accessing the first slice 322. Where the recommended path has been obtained, when an access request for the slice 322 is received subsequently, the recommended path may directly route the access request to the first storage system 110 wherein the slice 322 resides.

In subsequent operation of the user storage system 320, suppose an access request for a second slice 324 in the user storage system 320 is received, then one candidate path may be selected from multiple candidate paths as shown in Table 1. As seen from FIG. 3, the second slice 324 in the user storage system 320 resides in the second storage system 210. Suppose the first path is selected, as seen from FIG. 6, the selected path does not route guide the access request to the destination (second storage system 210) where the slice 324 resides, but guides the access request to the first storage system 110. At this point, the access request may be forwarded from the first storage system 110 to the correct destination, namely the second storage system 210, so that the second storage system 210 may respond to the access request.

According to example implementations of the present disclosure, it may be indicated with a specific message (e.g., with SCSI sense key): the selected candidate path fails to guide the access request to the correct destination. In subsequent operation, if the server 122 receives an access request for the second slice 324, then a selection may be made among those candidate paths which have not been selected. Then, the access request is routed by the selected path. If the selected path routes the access request to the second storage system 210, then the selected path is marked as a recommended path. If the selected path does not route the access request to the second storage system 210, then a forward operation is performed, and it is reported with a specific message: the selected path fails to guide the access request to the correct destination. Operations may be repeated according to the above method, till a candidate path (e.g., path 3 shown in Table 3) that can route the access request to the correct destination is found.

With the above described method, a recommended path for accessing each slice in the user storage system 320 may be obtained one by one. According to example implementations of the present disclosure, a recommended path table may be built to record recommended paths for various slices in the user storage system 320. According to example implementations of the present disclosure, recommended paths may be recorded in a form shown in Table 2 below.

TABLE 2

Recommended Paths for Slices

| No. | Slice Identifier | Recommended Path |
|---|---|---|
| 1 | Slice 1 | Candidate path 1 |
| 2 | Slice 2 | Candidate path 3 |
| ... | ... | ... |

In Table 2, the first column represents a sequence number, the second column represents the identifier of a slice, and the third column "recommended path" represents a recommended path for a slice shown in the second column. It will be understood here the candidate path 1 is the candidate path 1 shown in Table 1. For various nodes in paths, reference may be made to Table 1. It will be understood in the running process of the user storage system 320, a recommended path may be determined for each slice according to the above described method.

In the running process of the user storage system 320, a failure might occur in an inter-port connection, a port of the switch 620 and a control node of the storage system. At this point, an access request for a certain slice could not be routed to a corresponding destination simply in reliance on recommended paths shown in Table 2. At this point, standby paths for various paths may be determined in advance.

According to example implementations of the present disclosure, a further path may be selected from candidate paths as a standby path. For example, a path that fails to route the access request to the correct destination in the above process may be set as a standby path. Although it might take more time to route the access request by the standby path than the recommended path, the standby path may offer support when the recommended path fails to work normally. Alternatively and/or in addition to, a recommended path among multiple candidate paths which can route the access request to the correct destination may be marked as a standby path.

According to example implementations of the present disclosure, a data structure may be arranged separately to store standby paths for various slices. Alternatively and/or in addition to, standby paths for various slices may be added to Table 2. With the above example implementations, even if a failure occurs in connections between the server 122 and the first storage system 110, the second storage system 210, the access request may be conveniently routed to the corresponding destination by a standby path.

Figure 7:
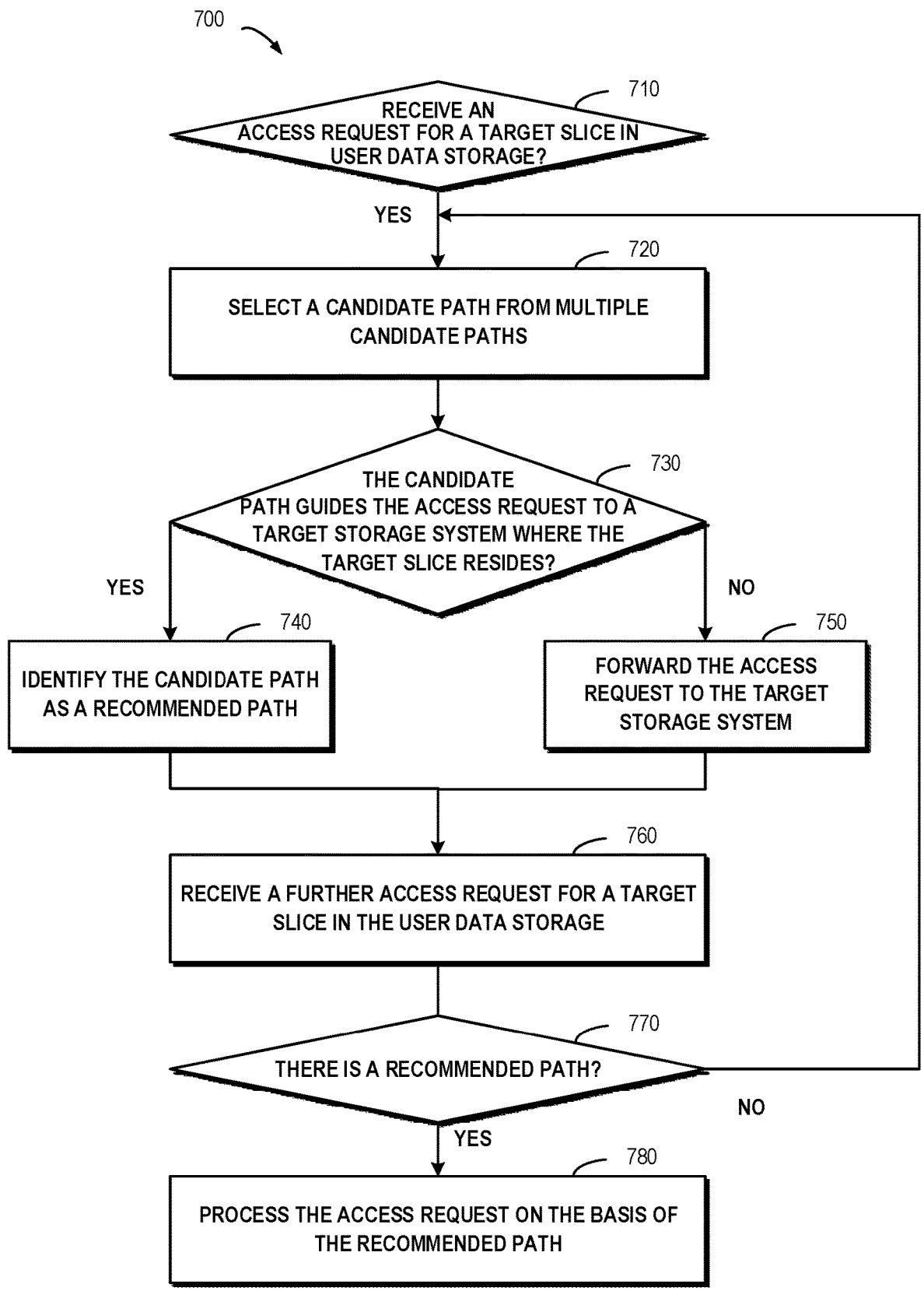
FIG. 7 schematically shows a flowchart of a method for accessing data in a user storage system according to implementations of the present disclosure.

With reference to FIG. 7, description is presented below to varieties of circumstances that might arise when accessing slices in the user storage system 320. FIG. 7 schematically shows a flowchart of a method 700 for accessing data in the user storage system according to implementations of the present disclosure. At block 710, it is judged whether an access request for a target slice in the user storage system 320 is received or not. If the judgment result is "yes," then the method 700 proceeds to block 720. At block 720, a candidate path is selected from multiple candidate paths.

Then, at block 730, the access request is routed by the selected candidate path. If the selected candidate path can route the access request to a target storage system where the target slice resides, then the method 700 proceeds to block 740 so as to identify the selected candidate path as a recommended path. If the selected candidate path fails to route the access request to the target storage system where the target slice resides, then the method 700 proceeds to block 750. At this point, the storage system that has received the access request may forward the access request to the target storage system where the target slice resides.

At block 760, another access request for the target slice may be received. At block 770, it may be judged whether the target slice already has a recommended path or not. If the judgment result is "yes," then the method 700 proceeds to block 780 so as to process the newly received access request on the basis of the recommended path. If the judgment result is "no," then the method 700 returns to block 720. At this point, a next candidate path that has not been selected may be selected from multiple candidate paths at block 720. It will be understood the processing for only one slice in the user storage system 320 has been illustrated in FIG. 7. The processing for other slice is similar, which is not detailed here.

According to example implementations of the present disclosure, the storage system 110 and the second storage system 210 may be RAID-based storage systems. It will be understood the RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 8A:
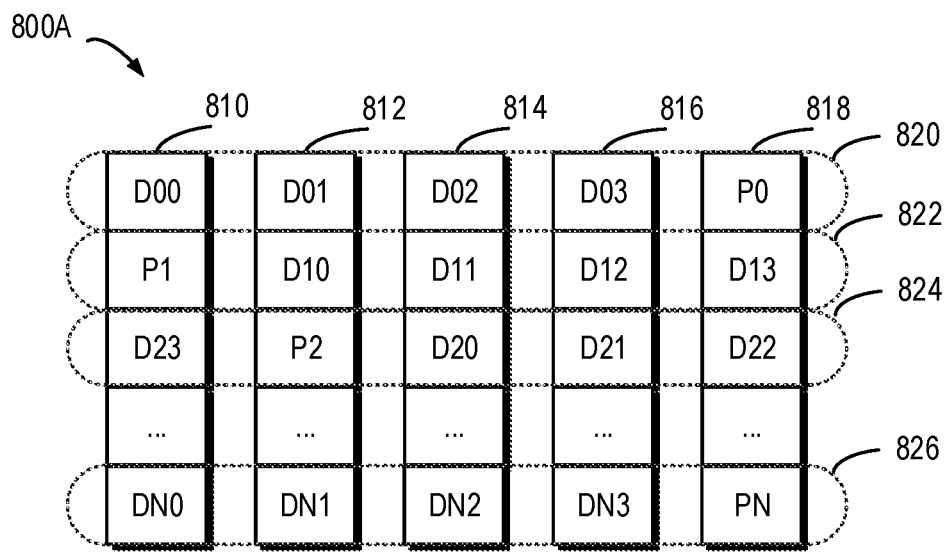
FIG. 8A schematically shows a view of a storage system according to implementations of the present disclosure.

FIG. 8A schematically illustrates a schematic view of a storage system 800 according to implementations of the present disclosure. In the storage system shown in FIG. 8A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (810, 812, 814, 816 and 818) as an example. It should be noted although five storage devices are schematically shown in FIG. 8A, in other implementations more or less storage devices may be comprised according to different levels of RAID. The storage system 800 may include multiple stripes. A though FIG. 8A illustrates stripes 820, 822, 824, . . . , and 826, in other examples the RAID system may further include a different number of stripes.

In RAID, a stripe crosses multiple physical storage devices (for example, the stripe 820 crosses storage the devices 810, 812, 814, 816 and 818). The stripe may be simply construed as a storage area among multiple storage devices which satisfies a given address range. Data stored in the stripe 820 includes multiple parts: a data block D00 stored in the storage device 810, a data block D01 stored in the storage device 812, a data block D02 stored in the storage device 814, a data block D03 stored in the storage device 816, and a data block P0 stored in the storage device 818. In this example, the data blocks D00, D01, D02 and D03 are stored data, and the data block P0 is a P parity of the stored data.

The mode of storing data in other stripes 822 and 824 is similar to that in the stripe 820, and the difference is that the parity about other data block may be stored in other storage device than the storage device 818. In this way, when one of the multiple storage devices 810, 812, 814, 816 and 818 fails, data in the failed device may be recovered from other normal storage devices.

Figure 8B:
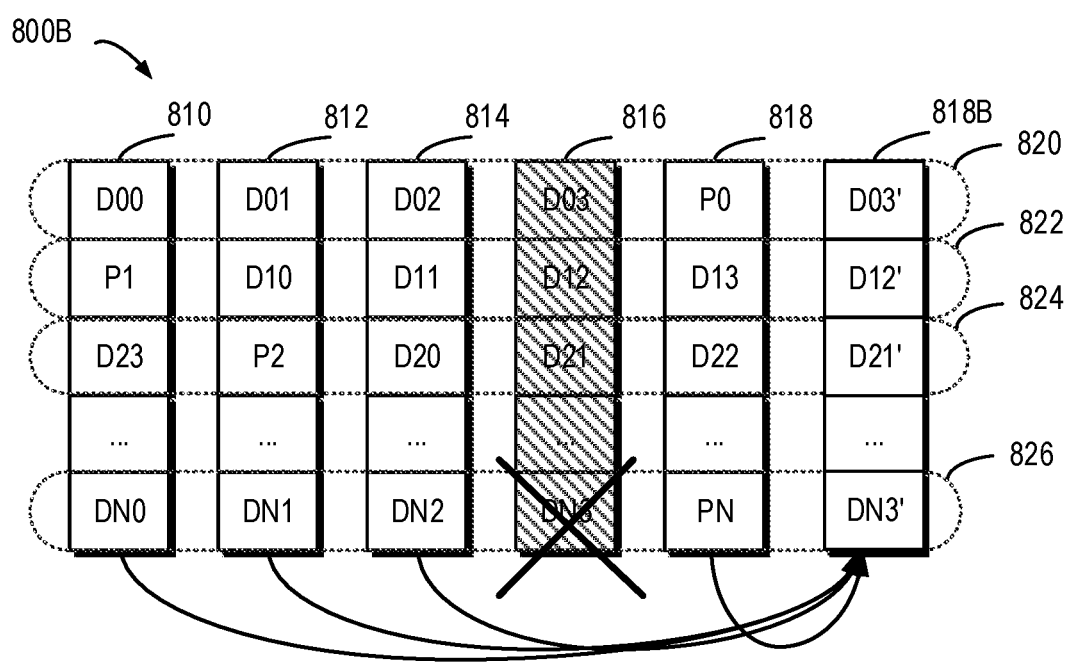
FIG. 8B schematically shows a view of a rebuild process of a storage system according to implementations of the present disclosure.

FIG. 8B schematically illustrates a schematic view 800B of rebuilding process of a storage system according to implementations of the present disclosure. As shown in FIG. 8B, when one storage device (e.g. the shaded storage device 816) fails, data may be recovered from the other storage devices 810, 812, 814 and 818 that operate normally. At this point, a new backup storage device 818B may be added to RAID to replace the storage device 818. In this way, recovered data may be written to 818B, and system rebuilding may be realized.

Note while a RAID-5 storage system including 5 storage devices (among which 4 storage devices are used for storing data and 1 storage device is used for storing parity) has been described with reference to FIGS. 8A and 8B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 9:
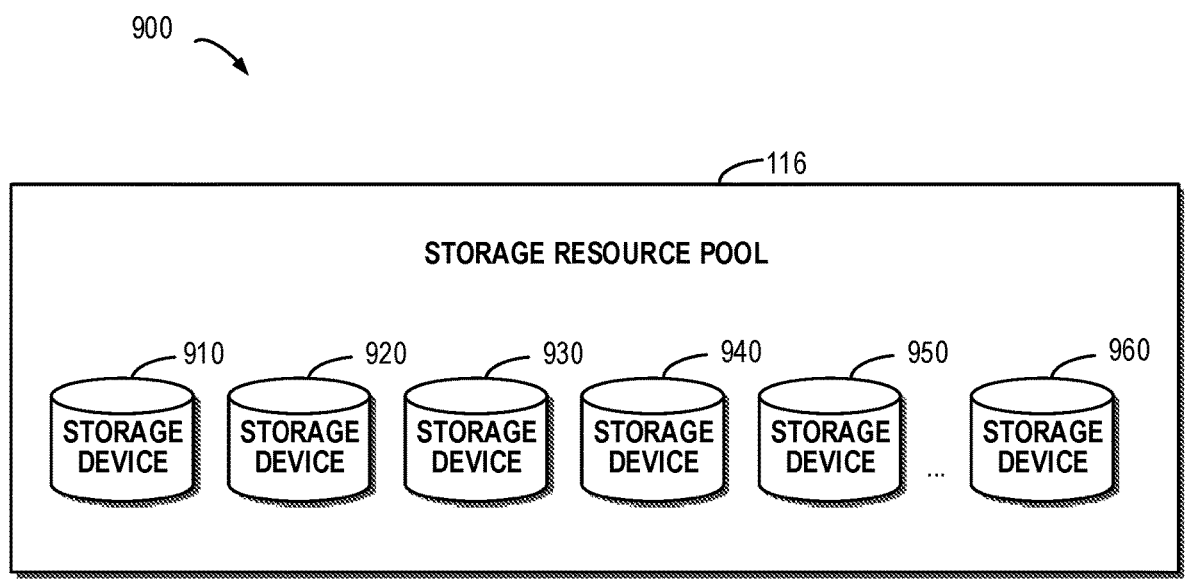
FIG. 9 schematically shows a block diagram of a storage resource pool according to implementations of the present disclosure.

With the development of distributed storage technologies, the various storage devices 810, 812, 814, 816 and 818 in the storage system shown in FIGS. 8A and 8B may be no longer limited to physical storage devices but may be virtual storage devices. For example, respective extents on the storage device 810 may come from different physical storage devices (hereinafter referred to as storage devices for short) in the resource pool. FIG. 9 schematically shows a block diagram of a storage resource pool 116 according to implementations of the present disclosure. As depicted, the storage resource pool 160 may include multiple physical storage devices 910, 920, 930, 940, 950, . . . , 960.

Figure 10:
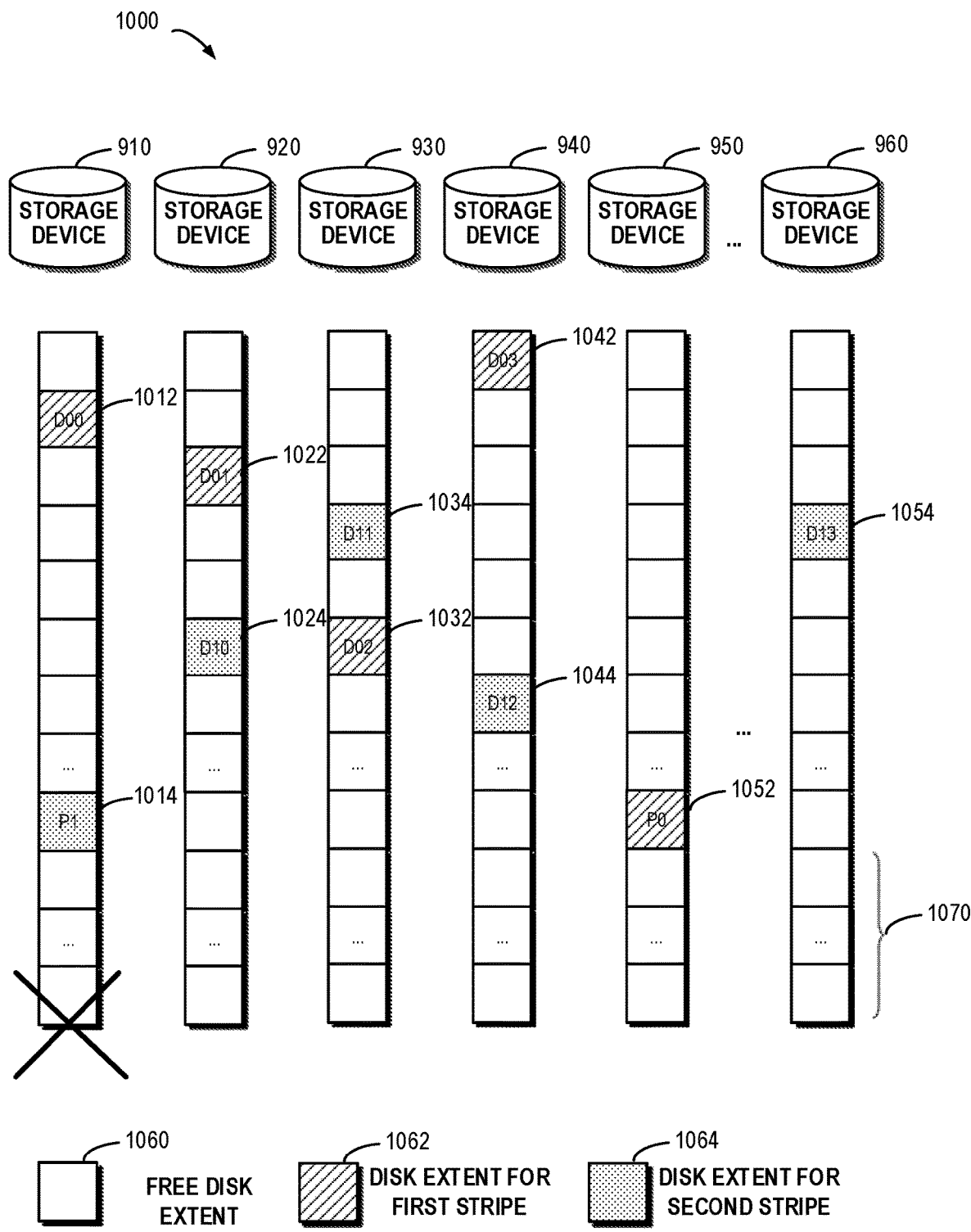
FIG. 10 schematically shows a block diagram of an extent in the storage resource pool in FIG. 9.

FIG. 10 schematically shows a block diagram of extents in the storage resource pool as shown in FIG. 9. The storage resource pool 116 may include multiple storage devices 910, 920, 930, 940, 950, . . . , 960. Each storage device may include multiple extents, wherein a blank extent (as shown by a legend 1060) represents a free extent, an extent (as shown by a legend 1062) shown with slashes represents an extent for a first stripe of the storage system 800A in FIG. 8A, and a shaded extent (as shown by a legend 1064) represents an extent for a second stripe of the storage system 800A in FIG. 8A. At this point, extents 1012, 1022, 1032, 1042 and 1052 for the first stripe are for storing data blocks D00, D01, D02, D03 and parity P0 of the first stripe respectively. Extents 1024, 1034, 1044, 1054 and 1014 for the second stripe are for storing blocks D10, D11, D12, D13 and parity P1 of the second stripe respectively.

As shown in FIG. 10, there may exist a reserved free portion 1070 in each storage device, so that when a storage device in the resource pool fails, extents in the free portion 1070 in each storage device may be selected to rebuild various extents in the failed storage device.

Note in FIG. 10 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

Specific implementations of the first storage system 110 and the second storage system 210 have been shown with reference to FIGS. 8A to 10. It will be understood the first storage system 110 and the second storage system 210 may use the same or different organization modes, so long as they can expose a desired number of slices to the outside and perform an operation to a target slice as a correct response to an access request for the target slice.

While examples of the method according to the present disclosure have been described in detail with reference to FIGS. 3 to 10, description is presented below to the implementation of a corresponding apparatus. According to example implementations of the present disclosure, provided is an apparatus for managing a storage space, extents in the storage space coming from multiple storage devices in a resource pool associated with storage systems. The apparatus includes: an obtaining module configured to, in response to receiving an allocation request for allocating a storage space, obtain the size of a storage space and the size of a slice in the storage space which are specified by the allocation request; a selecting module configured to select a first storage system and a second storage system from multiple storage systems, the first storage system and the second storage system including a first group of storage devices and a second group of storage devices respectively, and the first group of storage devices not overlapping the second group of storage devices; a slice obtaining module configured to obtain a first group of slices and a second group of slices from the first storage system and the second storage system respectively, on the basis of the size of the storage space and the size of the slice; and a building module configured to build a user storage system on the basis of the first group of slices and the second group of slices, so as to respond to the allocation request.

Figure 11:
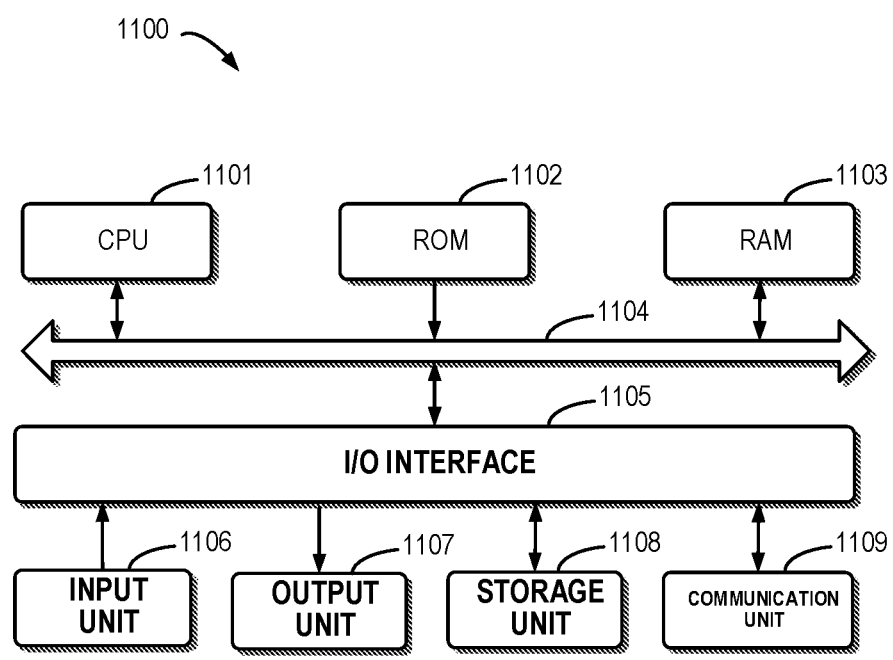
FIG. 11 schematically shows a block diagram of an apparatus for managing a storage space according to example implementations of the present disclosure.

FIG. 11 schematically shows a block diagram of an apparatus 1100 for managing a storage system according to example implementations of the present disclosure. As depicted, the apparatus 1100 includes a central process unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the apparatus 1100. CPU 1101, ROM 1102 and RAM 1103 are connected to each other via a bus 1104. The input/output (I/O) interface 1105 is also connected to the bus 1104.

A plurality of components in the apparatus 1100 is connected to the I/O interface 1105, including: an input unit 1106, such as keyboard, mouse and the like; an output unit 1107, e.g., various kinds of display and loudspeakers etc.; a storage unit 1108, such as magnetic disk and optical disk etc.; and a communication unit 1109, such as network card, modem, wireless transceiver and the like. The communication unit 1109 allows the apparatus 1100 to exchange information/data with other devices via the computer network, such as Internet, and/or various telecommunication networks.

The above described each process and treatment, such as the methods 400 and 700, can also be executed by the processing unit 1101. For example, in some implementations, the methods 400 and 700 can be implemented as a computer software program tangibly included in the machine-readable medium, e.g., the storage unit 1108. In some implementations, the computer program can be partially or fully loaded and/or mounted to the apparatus 1100 via ROM 1102 and/or the communication unit 1109. When the computer program is loaded to the RAM 1103 and executed by the CPU 1101, one or more steps of the above described methods 400 and 700 can be implemented. Alternatively, in other implementations, the CPU 1101 also can be configured in other suitable manners to realize the above procedure/method.

According to example implementations of the present disclosure, there is provided an apparatus for managing a storage space, the apparatus including: at least one processor; a volatile memory; and a memory coupled to the at least one processor, the memory having instructions stored thereon, the instructions, when executed by the at least one processor, causing the apparatus to perform acts. The acts include: in response to receiving an allocation request for allocating a storage space, obtaining the size of a storage space and the size of a slice in the storage space which are specified by the allocation request; selecting a first storage system and a second storage system from multiple storage systems, the first storage system and the second storage system including a first group of storage devices and a second group of storage devices respectively, and the first group of storage devices not overlapping the second group of storage devices; obtaining a first group of slices and a second group of slices from the first storage system and the second storage system respectively, on the basis of the size of the storage space and the size of the slice; and building a user storage system at least on the basis of the first group of slices and the second group of slices, so as to respond to the allocation request.

According to example implementations of the present disclosure, building a user storage system at least on the basis of the first group of slices and the second group of slices includes: building an address mapping of the user storage system, the address mapping including a mapping relationship between each slice in the user storage system and a storage system where each slice resides.

According to example implementations of the present disclosure, obtaining a first group of slices and a second group of slices from the first storage system and the second storage system respectively includes: obtaining a first workload and a second workload of the first storage system and the second storage system respectively; and selecting the first group of slices and the second group of slices on the basis of the first workload and the second workload.

According to example implementations of the present disclosure, the first workload includes at least any of a storage resource service load or an access load of the first storage system.

According to example implementations of the present disclosure, the acts further include: in response to receiving an expansion request for expanding the user storage system, obtaining the size of an expanded space specified by the expansion request; selecting a third storage system from the multiple storage systems, the third storage system including a third group of storage devices; obtaining a third group of slices from the third storage system on the basis of the size of the expanded space and the size of the slice; and expanding the user storage system at least on the basis of the third group of slices, so as to respond to the expansion request.

According to example implementations of the present disclosure, the acts further include: regarding a slice in the user storage system, obtaining multiple candidate paths for accessing the slice, wherein an access server of the user storage system is connected to one of multiple control nodes of the first storage system via a group of ports respectively, the multiple control nodes being used to access data in the first storage system, a candidate path of the multiple candidate paths including a port in the group of ports and a control node among the multiple control nodes.

According to example implementations of the present disclosure, the acts further include: in response to receiving an access request for a target slice in the user storage system, determining multiple candidate paths for accessing the target slice; and accessing the target slice via a candidate path of the multiple candidate paths.

According to example implementations of the present disclosure, accessing the target slice via a candidate path of the multiple candidate paths includes: in response to determining the candidate path guides the access request to a target storage system where the target slice resides, identifying the candidate path as a recommended path.

According to example implementations of the present disclosure, accessing the target slice via a candidate path of the multiple candidate paths includes: in response to determining the candidate path fails to guide the access request to a target storage system where the target slice resides, forwarding the access request to the target storage system so that the target storage system responds to the access request.

According to example implementations of the present disclosure, the acts further include: in response to receiving a further access request for the target slice, obtaining a further candidate path of the multiple candidate paths; and accessing the target slice via the further candidate path.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage space, comprising:
    in response to receiving an allocation request for allocating a storage space, obtaining a size of a storage space and a size of a slice in the storage space which are specified by the allocation request;
    selecting a first storage system and a second storage system from multiple storage systems across which the storage space is provided, the first storage system and the second storage system comprising a first group of storage devices and a second group of storage devices respectively, and the first group of storage devices not overlapping the second group of storage devices, each of the first storage system and second storage system including two or more respective control nodes providing parallel access to the respective group of storage devices of the respective storage system;
    obtaining a first group of slices and a second group of slices from the first storage system and the second storage system respectively, on the basis of the size of the storage space and the size of the slice; and
    building a user storage system at least on the basis of the first group of slices and the second group of slices, so as to respond to the allocation request;
    maintaining a per-slice recommended path table having a plurality of entries, each entry associating a respective individual slice with a corresponding recommended path to a corresponding storage system on which the slice resides; and
    in response to a access request for a target slice residing on a corresponding target storage system, determining whether the per-slice recommended path table includes a recommended path for the target slice, and if so then using the recommended path to route the access request to the target storage system, and otherwise identifying and using an alternative path to route the access request to the target storage system.

2. The method of claim 1, wherein building a user storage system at least on the basis of the first group of slices and the second group of slices comprises:
    building an address mapping of the user storage system, the address mapping comprising a mapping relationship between each slice in the user storage system and a storage system where each slice resides.

3. The method of claim 1, wherein obtaining a first group of slices and a second group of slices from the first storage system and the second storage system respectively comprises:
    obtaining a first workload and a second workload of the first storage system and the second storage system respectively; and
    selecting the first group of slices and the second group of slices on the basis of the first workload and the second workload.

4. The method of claim 3, wherein the first workload comprises at least any of a storage resource service load or an access load of the first storage system.

5. The method of claim 1, further comprising: in response to receiving an expansion request for expanding the user storage system,
    obtaining the size of an expanded space specified by the expansion request;
    selecting a third storage system from the multiple storage systems, the third storage system comprising a third group of storage devices;
    obtaining a third group of slices from the third storage system on the basis of the size of the expanded space and the size of the slice; and
    expanding the user storage system at least on the basis of the third group of slices, so as to respond to the expansion request.

6. The method of claim 1, wherein each recommended path is determined from a corresponding set of candidate paths, and wherein maintaining the per-slice recommended path table includes:
    regarding a slice in the user storage system, obtaining multiple candidate paths for accessing the slice,
    wherein an access server of the user storage system is connected to one of the control nodes of the first storage system via a group of ports respectively, the control nodes being used to access data in the first storage system, a candidate path of the multiple candidate paths comprising a port in the group of ports and a control node among the control nodes.

7. The method of claim 6, wherein identifying and using an alternative path includes:
    accessing the target slice via a candidate path of the multiple candidate paths.

8. The method of claim 6, wherein the recommended path is determined from the set of candidate paths by:
    in response to determining that a candidate path guides an access request to the target storage system where the target slice resides, identifying the candidate path as the recommended path.

9. The method of claim 8, wherein accessing the target slice via a candidate path of the multiple candidate paths comprises:
    in response to determining the candidate path fails to guide the access request to a target storage system where the target slice resides, forwarding the access request to the target storage system so that the target storage system responds to the access request.

10. The method of claim 9, further comprising: in response to receiving a further access request for the target slice,
    obtaining a further candidate path of the multiple candidate paths; and
    accessing the target slice via the further candidate path.

11. An apparatus for managing a storage space, comprising:
- at least one processor;
- a volatile memory; and
- a memory coupled to the at least one processor and having instructions stored thereon, the instructions, when executed by the at least one processor, causing the apparatus to perform acts comprising:
  - in response to receiving an allocation request for allocating a storage space, obtaining a size of a storage space and a size of a slice in the storage space which are specified by the allocation request;
  - selecting a first storage system and a second storage system from multiple storage systems across which the storage space is provided, the first storage system and the second storage system comprising a first group of storage devices and a second group of storage devices respectively, and the first group of storage devices not overlapping the second group of storage devices, each of the first storage system and second storage system including two or more respective control nodes providing parallel access to the respective group of storage devices of the respective storage system;
  - obtaining a first group of slices and a second group of slices from the first storage system and the second storage system respectively, on the basis of the size of the storage space and the size of the slice;
  - building a user storage system at least on the basis of the first group of slices and the second group of slices, so as to respond to the allocation request;
  - maintaining a per-slice recommended path table having a plurality of entries, each entry associating a respective individual slice with a corresponding recommended path to a corresponding storage system on which the slice resides; and
  - in response to a access request for a target slice residing on a corresponding target storage system, determining whether the per-slice recommended path table includes a recommended path for the target slice, and if so then using the recommended path to route the access request to the target storage system, and otherwise identifying and using an alternative path to route the access request to the target storage system.

12. The apparatus of claim 11, wherein building a user storage system at least on the basis of the first group of slices and the second group of slices comprises:
- building an address mapping of the user storage system, the address mapping comprising a mapping relationship between each slice in the user storage system and a storage system where each slice resides.

13. The apparatus of claim 11, wherein obtaining a first group of slices and a second group of slices from the first storage system and the second storage system respectively comprises:
- obtaining a first workload and a second workload of the first storage system and the second storage system respectively; and
- selecting the first group of slices and the second group of slices on the basis of the first workload and the second workload.

14. The apparatus of claim 13, wherein the first workload comprises at least any of a storage resource service load or an access load of the first storage system.

15. The apparatus of claim 11, wherein the acts further comprise: in response to receiving an expansion request for expanding the user storage system,
- obtaining the size of an expanded space specified by the expansion request;
- selecting a third storage system from the multiple storage systems, the third storage system comprising a third group of storage devices;
- obtaining a third group of slices from the third storage system on the basis of the size of the expanded space and the size of the slice; and
- expanding the user storage system at least on the basis of the third group of slices, so as to respond to the expansion request.

16. The apparatus of claim 11, wherein each recommended path is determined from a corresponding set of candidate paths, and wherein maintaining the per-slice recommended path table includes:
- regarding a slice in the user storage system, obtaining multiple candidate paths for accessing the slice,
- wherein an access server of the user storage system is connected to one of the control nodes of the first storage system via a group of ports respectively, the control nodes being used to access data in the first storage system, a candidate path of the multiple candidate paths comprising a port in the group of ports and a control node among the control nodes.

17. The apparatus of claim 16, wherein identifying and using an alternative path includes:
- accessing the target slice via a candidate path of the multiple candidate paths.

18. The apparatus of claim 16, wherein the recommended path is determined from the set of candidate paths by:
- in response to determining that a candidate path guides the access request to the target storage system where the target slice resides, identifying the candidate path as the recommended path.

19. The apparatus of claim 18, wherein accessing the target slice via a candidate path of the multiple candidate paths comprises:
- in response to determining the candidate path fails to guide the access request to a target storage system where the target slice resides, forwarding the access request to the target storage system so that the target storage system responds to the access request.

20. The apparatus of claim 19, wherein the acts further comprise: in response to receiving a further access request for the target slice,
- obtaining a further candidate path of the multiple candidate paths; and
- accessing the target slice via the further candidate path.

21. A computer program product having a non-transitory computer readable medium which stores a set of instructions to manage a storage space; the set of instructions, when carried out by computerized circuitry, causing the computerized circuitry to perform a method of:
- in response to receiving an allocation request for allocating a storage space, obtaining a size of the storage space and a size of a slice in the storage space which are specified by the allocation request;
- selecting a first storage system and a second storage system from multiple storage systems across which the storage space is provided, the first storage system and the second storage system comprising a first group of storage devices and a second group of storage devices respectively, and the first group of storage devices not overlapping the second group of storage devices, each of the first storage system and second storage system including two or more respective control nodes providing parallel access to the respective group of storage devices of the respective storage system;

obtaining a first group of slices and a second group of slices from the first storage system and the second storage system respectively, on the basis of the size of the storage space and the size of the slice;

building a user storage system at least on the basis of the first group of slices and the second group of slices, so as to respond to the allocation request;

maintaining a per-slice recommended path table having a plurality of entries, each entry associating a respective individual slice with a corresponding recommended path to a corresponding storage system on which the slice resides; and in response to a access request for a target slice residing on a corresponding target storage system, determining whether the per-slice recommended path table includes a recommended path for the target slice, and if so then using the recommended path to route the access request to the target storage system, and otherwise identifying and using an alternative path to route the access request to the target storage system.

* * * * *